United States Patent
Benz et al.

(10) Patent No.: US 11,987,204 B2
(45) Date of Patent: May 21, 2024

(54) DEFLECTION DEVICE FOR A SAFETY BELT

(71) Applicant: ZF AUTOMOTIVE GERMANY GMBH, Alfdorf (DE)

(72) Inventors: Thomas Benz, Schwäbisch Gmünd (DE); Markus Sorg, Heuchlingen (DE); Edgar Schneider, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 441 days.

(21) Appl. No.: 17/292,438

(22) PCT Filed: Nov. 4, 2019

(86) PCT No.: PCT/EP2019/080035
§ 371 (c)(1),
(2) Date: May 9, 2021

(87) PCT Pub. No.: WO2020/099159
PCT Pub. Date: May 22, 2020

(65) Prior Publication Data
US 2022/0017038 A1    Jan. 20, 2022

(30) Foreign Application Priority Data

Nov. 15, 2018 (DE) ............. 10 2018 128 619.8

(51) Int. Cl.
*B60R 22/24* (2006.01)
*C09D 163/00* (2006.01)
*B60R 22/18* (2006.01)

(52) U.S. Cl.
CPC ............ *B60R 22/24* (2013.01); *C09D 163/00* (2013.01); *B60R 2022/1818* (2013.01)

(58) Field of Classification Search
CPC . B60R 22/24; B60R 22/18; B60R 2022/1818; C09D 163/00
See application file for complete search history.

(56) References Cited

U.S. PATENT DOCUMENTS

| | | | |
|---|---|---|---|
| 7,192,057 B2 * | 3/2007 | Moendel | B60R 22/18 280/808 |
| 2005/0253370 A1 * | 11/2005 | Nakamura | B60R 22/18 280/801.1 |
| 2007/0126223 A1 * | 6/2007 | Moendel | B60R 22/18 297/483 |

FOREIGN PATENT DOCUMENTS

| | | |
|---|---|---|
| DE | 19515562 A1 | 10/1996 |
| DE | 19940852 A1 | 3/2000 |
| DE | 20008314 U1 | 9/2000 |
| DE | 102009060721 A1 | 6/2011 |

(Continued)

OTHER PUBLICATIONS

PCT Search Report for corresponding Application Serial No. PCT/EP2019/080035, dated Dec. 6, 2019, pp. 1-4.

*Primary Examiner* — Robert Sandy
(74) *Attorney, Agent, or Firm* — TAROLLI, SUNDHEIM, COVELL & TUMMINO L.L.P.

(57) ABSTRACT

A deflection device for a seatbelt system in a vehicle including a deflection fitting which includes a guide gap through which a webbing can be guided. The guide gap has a bearing surface for the webbing and is provided, at least on the bearing surface, with a friction-reducing slide coating formed of an epoxy resin powder paint.

14 Claims, 1 Drawing Sheet

(56) References Cited

FOREIGN PATENT DOCUMENTS

DE 102015206730 A1 10/2016

* cited by examiner

DEFLECTION DEVICE FOR A SAFETY BELT

RELATED APPLICATIONS

This application corresponds to PCT/EP2019/080035 filed Nov. 4, 2019, which claims the benefit of German Application No. 10 2018 128 619.8 filed Nov. 15, 2018, the subject matter of which are incorporated herein by reference in their entirety.

BACKGROUND OF THE INVENTION

The invention relates to a deflection device for a seatbelt system in a vehicle comprising a deflection fitting which includes a guide gap through which a webbing can be guided, the deflection fitting having a bearing surface for the webbing in the area of the guide gap, and the deflection fitting being provided, at least on the bearing surface, with a friction-reducing slide coating.

Seatbelt systems for motor vehicles usually include a deflection device having a deflection fitting that may be fastened to the vehicle body such as on the B-pillar. One example of those seatbelt systems are three-point seatbelts. The seatbelt serves for fixing a vehicle occupant on the vehicle seat, for example during collision with an obstacle. The seatbelt must withstand enormous forces without being damaged. The forces occurring in the area of the deflection device can be influenced by further parts of the seatbelt system such as by existing belt tensioners and/or belt force limiters.

The deflection fitting may be an integral metal body manufactured from sheet steel by cold-forming and may have a guide gap through which a webbing can be guided as well as a mounting hole for a fastening screw by means of which the deflection fitting can be fastened to the vehicle body. Especially at edges in the area of the guide gap, high friction values may occur on a webbing guided through the deflection fitting which in the worst case can result in damage or in rupture of the webbing.

It is known to receive the deflection fitting in a plastic sheath, for example. However, already during the manufacturing process in those sheaths frequently tensions which may result in uncontrolled flaking of the plastic sheath in the event of crash are produced in the material. Also, those plastic sheaths often show no sufficient friction-reducing effect.

From EP 1 167 133 A2, a deflection device for a seatbelt is known which includes a deflection element. On a belt running portion that is in contact with a seatbelt, the deflection element is provided with a slide coating reducing the friction resistance. The slide coating consists of a fluoropolymer matrix and reinforcing substances incorporated therein.

SUMMARY OF THE INVENTION

It is the object of the invention to provide a deflection fitting which shows reduced friction when it contacts a webbing guided through the deflection fitting and which can be manufactured at low cost.

According to the invention, the object is achieved by a deflection device for a seatbelt system in a vehicle, comprising a deflection fitting that includes a guide gap through which a webbing can be guided, the deflection fitting having a bearing surface for the webbing in the area of the guide gap, and wherein the deflection fitting is provided with a friction-reducing slide coating at least on the bearing surface, characterized in that the slide coating is made of an epoxy resin powder paint.

An epoxy resin powder paint constitutes a cost-efficient coating option which is easy to apply. Unlike plastic sheaths, epoxy resin powder paints show fewer tensions in the applied coating, thus efficiently preventing uncontrolled flaking in the event of high loads.

The epoxy resin powder paint may comprise or consist of an epoxy resin as main constituent and polytetrafluoroethylene (PTFE) as well as optionally fillers and/or further additives. Epoxy resins are particularly suited, due to their hardness and proper temperature resistance, as main constituent for a slide coating and adhere properly to metal surfaces. In this way, damage of the coating due to mechanical impact and heat produced by friction can be avoided. PTFE serves as an additive for adjusting the desired friction-reducing property of the epoxy powder paint. Thus, the PTFE is provided finely spread in an epoxy resin matrix. The use of PTFE as additive rather than as main constituent of the coating facilitates processing and application of the coating as compared to a coating material which is mainly made from PTFE.

Both for adjusting the friction-reducing effect to a desired value and for facilitating the processing of the powder paint, at least one filler selected from the group consisting of graphite, soot, aluminum oxide, molybdenum disulfide and silicon dioxide may be contained.

Furthermore, the epoxy resin powder paint can comprise at least one of the following additives: hardeners, flow-control agents, degassing additives, cross-linkers, pigments, flame retardants, antioxidants, UV-stabilizers. It is thus possible to adjust the powder paint to the desired application, such as with regard to processing thereof or to its mechanical properties.

The epoxy resin powder paint may contain epoxy resin in a proportion of from 85 to 95 wt-%, preferably from 85 to 90 wt-%, polytetrafluoroethylene in a proportion of from 5 to 15 wt-%, preferably from 5 to 10 wt-%, as well as fillers and/or additives in a proportion of from 0 to 10 wt-%, preferably from 0 to 5 wt-%, each based on the total weight of the epoxy powder paint. With such composition, a slide coating having a desired friction-reducing effect can be produced, while at the same time enabling low-cost manufacture by the high epoxy resin constituent.

The slide coating applied to at least the bearing surface of the deflection fitting may have a thickness of from 80 to 120 µm. Such layer thickness helps achieve a sufficient friction-reducing effect, while at the same time coating being possible in an as material-saving manner as possible and sufficient thermal conduction to the base material of the coated deflection fitting being ensured.

In accordance with a preferred embodiment, the entire deflection fitting is provided with the slide coating. This allows the coating to be easily applied, as for example the entire component part can be sprayed with the paint still in powder form, and the paint then can be cured by means of heating. In the case of collision, it may be advantageous that, apart from the bearing surface of the deflection fitting, further surfaces which may contact the webbing are provided with the friction-reducing slide coating, because the forces occurring may cause the webbing to slip within the guide gap so that parts of the webbing possibly might no longer be in contact with the bearing surface.

In accordance with another preferred embodiment, the deflection device comprises an insert in which the deflection fitting is received. For example, the deflection fitting may have a projection disposed to face the bearing surface, and the insert may have a holder, with the projection of the deflection fitting engaging in the holder of the insert so as to fix the deflection fitting on the insert. The insert may further comprise an adapter member that engages in the guide gap and, thus, reduces the gap opening. In this way, a contact surface opposed to the bearing surface is formed on the insert. Thus, the guide gap in which the webbing can be guided may be configured so as to largely prevent the webbing from slipping. Further, the guide gap can be configured so that, in the event of slipping, the webbing always remains in contact with the bearing surface. The insert may also be made from a material other than that of the deflection fitting, such as from plastic material. This embodiment also allows the deflection fitting to be fixed especially safely on the vehicle body, for example by adapting the shape of the insert to a recess in the vehicle body.

In order to reduce friction between the webbing and the contact surface, the adapter member and/or the insert can equally include the slide coating made from the epoxy resin powder paint at least on the contact surface. Moreover, in this case the webbing is ensured to be in contact with a low-friction surface even if it slips within the guide gap.

BRIEF DESCRIPTION OF THE DRAWINGS

Further advantages and characteristics of the invention will be evident from the following description and the drawings which are referred to, and wherein.

DESCRIPTION

Figure 1:
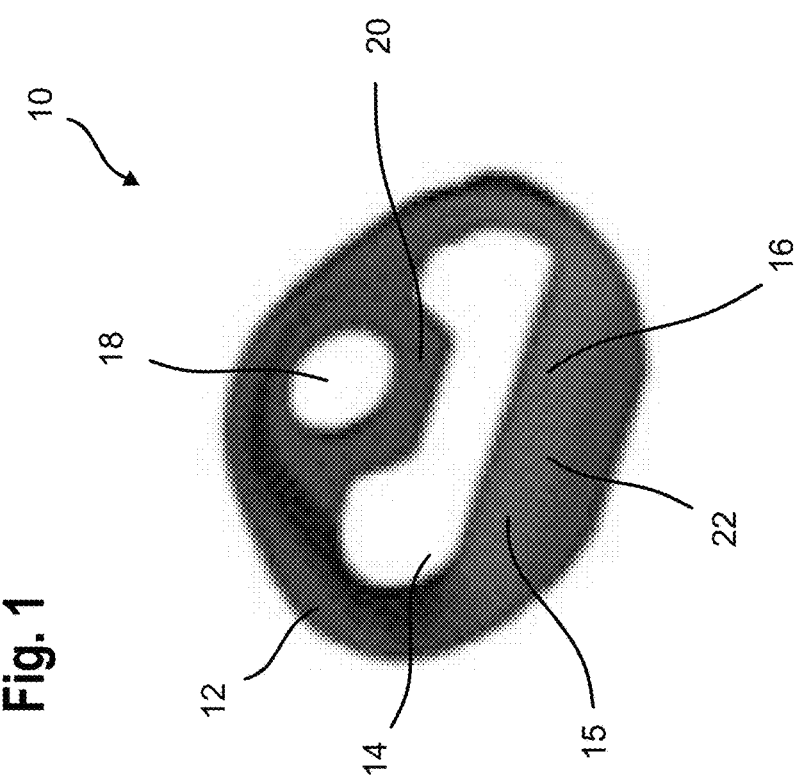
FIG. 1 shows a deflection fitting of a deflection device according to the invention.

FIG. 1 illustrates a deflection device 10 according to the invention for a seatbelt, especially for a motor vehicle, comprising a deflection fitting 12. The deflection fitting 12 is formed of a metal base plate and includes a guide gap 14 through which a webbing (not shown here) can be guided. In the area of the guide gap 14, the deflection fitting 12 includes a land 15 delimiting the guide gap 14 and having a bearing surface 16 curved in arc shape which forms a running surface for the webbing.

Moreover, the deflection fitting 12 includes a bore 18 through which a fastener can be guided to attach the deflection fitting 12 to the vehicle body such as to the B-pillar, the C-pillar or to a belt feeder. The attachment can be made by a screw, for example.

A projection 20 that may serve for anchoring the deflection fitting 12 is provided beneath the bore 18. Accordingly, it is possible to arrange both the projection 20 and the bore 18 to be offset against the bearing surface 16. The deflection fitting 12 thus need not necessarily be a flat component, but the land 15 may step out of the plane formed by the projection 20 and the bore 18. In this way, it is possible to adapt the size of the guide gap 14 to a desired geometry not only in height but also in depth.

The deflection fitting 12 can be made completely from metal, especially from sheet metal to which a slide coating 22 has been applied. The slide coating 22 is made from epoxy resin powder paint and, in the illustrated embodiment, is applied to the entire deflection fitting 12. However, it is also imaginable for the slide coating 22 to be applied only to a part of the deflection fitting 12, especially only to the bearing surface 16.

The epoxy resin powder paint can be applied to the deflection fitting 12 by electrostatic powder coating. For this purpose, the metallic, not yet coated deflection fitting 12 is connected to a voltage source. Subsequently, the powdered paint is sprayed onto the deflection fitting 12 through a nozzle which electrostatically charges the powder. Due to the electrostatic charge, the powder adheres to the energized component part. After that, the applied epoxy resin powder paint is cured by means of thermal treatment to form the slide coating 22. The thermal treatment is carried out, for example, for 10 minutes at a temperature of about 180° C.

In the illustrated embodiment, apart from the epoxy resin and polytetrafluoroethylene (PTFE), the epoxy resin powder paint further comprises soot, graphite and aluminum oxide as fillers as well as further additives. PTFE preferably has a proportion of at most 15 wt-% of the epoxy resin powder paint, whereas the epoxy resin accounts for a proportion of at least 85 wt-% of the epoxy resin powder paint.

The slide coating 22 made from the epoxy resin powder paint excels by proper mechanical resistance and excellent adhesive strength on metal surfaces. The afore-described slide coating 22 helps achieve a characteristic of 0 in a cross-cut test according to DIN EN ISO 2409 with a cutting edge spacing of 2 mm.

Figure 2:
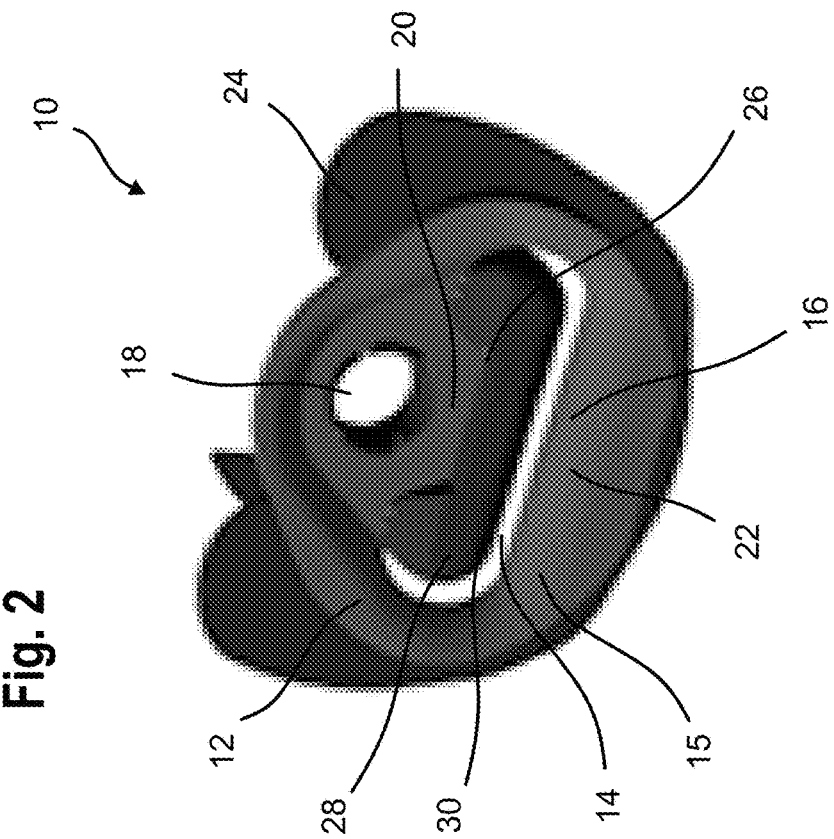
FIG. 2 shows a deflection device according to the invention comprising a deflection fitting and an insert.

FIG. 2 illustrates another embodiment of the deflection device 10 in which additionally an insert 24 having a holder 26 is provided, with the projection 20 of the deflection fitting 12 engaging in the holder 26. Like reference numerals are used for the component parts known from FIG. 1 and, insofar, the foregoing remarks will be referred to.

The insert 24 comprises an adapter member 28 that engages in the guide gap 14. A contact surface 30 facing the bearing surface 16 is formed on the adapter member. In this way, the size of the guide gap 14 is reduced, thus causing a webbing being guided through the guide gap 14 to have less play. The contact surface 30 may be configured so that the webbing is always at least partially in contact with the bearing surface 16 within the guide gap 14 even if it is slipping.

The insert 24 may be additionally connected to the vehicle body, for example by adhesive bonding or screwing. In this embodiment, too, the deflection fitting 12 includes a bore 18 through which a fastener can be guided to attach the deflection fitting 12 together with the insert 24 to the vehicle body such as to the B-pillar, to the C-pillar or to a belt feeder. The attachment can be made by a screw, for example.

According to another embodiment, the deflection device 10 can be attached to the vehicle body or to a belt feeder merely by the fastener without the insert 24 being additionally anchored to the vehicle body. In this case, the insert 24 can be held merely by the projection 20 of the deflection fitting 12 engaged in the holder 26 and/or by a sleeve (not shown) engaging in the bore 18.

The insert 24 may be made from metal, such as from sheet metal, to which the slide coating 22 made from epoxy resin powder paint has equally been applied. Of preference, the entire insert 24 is provided with the slide coating 22. However, it is also imaginable that the slide coating 22 is only applied to the contact surface 30 on the adapter member 28 facing the bearing surface 16. It is also possible that the insert 24 merely constitutes a plastic component optionally provided with the slide coating 22 made from epoxy resin powder paint.

In another embodiment, the deflection device 10 is not composed of a separate deflection fitting 12 and an insert 24. In this case, the deflection fitting 12 is formed integrally in the structure of the deflection device 10 shown in FIG. 2. Accordingly, both the bearing surface 16 and the contact surface 30 are formed by the deflection fitting 12 and are provided with the slide coating 22 made from epoxy resin powder paint.

The invention claimed is:

1. A deflection device (10) for a seatbelt system in a vehicle, comprising a deflection fitting (12) which includes a guide gap (14) through which a webbing can be guided,
wherein the deflection fitting (12) has a bearing surface (16) for the webbing in the area of the guide gap (14), and
wherein the deflection fitting (12) is provided with a friction-reducing slide coating (22) at least on the bearing surface (16),
wherein the slide coating (22) is formed of an epoxy resin powder paint,
and wherein the epoxy resin powder paint comprises at least one epoxy resin in a proportion of from 85 to 95 wt-%, polytetrafluoroethylene in a proportion of from 5 to 15 wt-%, as well as fillers and/or additives in a proportion of from 0 to 10 wt-% based on the total weight of the epoxy resin powder paint.

2. The deflection device according to claim 1, wherein the epoxy resin powder paint comprises an epoxy resin and polytetrafluoroethylene as well as fillers.

3. The deflection device according to claim 1, wherein the epoxy resin powder paint comprises at least one of the following fillers: graphite, soot, aluminum oxide, molybdenum disulfide, silicon dioxide.

4. The deflection device according to claim 1, wherein the epoxy resin powder paint comprises at least one of the following additives: hardeners, flow-control agents, degassing additives, cross-linking agents, pigments, flame-retardants, antioxidant agents, UV stabilizers.

5. The deflection device according to claim 1, wherein the slide coating has a thickness of from 80 to 120 µm.

6. The deflection device according to claim 1, wherein the entire deflection fitting (12) is provided with the slide coating (22).

7. The deflection device according to claim 1, wherein the deflection device (10) includes a contact surface (30) facing the bearing surface (16) of the deflection fitting (12).

8. The deflection device according to claim 1, wherein the deflection device (10) includes an insert (24) having a holder (26) and an adapter member (28), and in that the deflection fitting (12) includes a projection (20) which is arranged to face the bearing surface (16), the projection (20) of the deflection fitting (12) engaging in the holder (26) of the insert (24) and the adapter member (28) engaging in the guide gap (12) so that a contact surface (30) facing the bearing surface (16) is formed on the adapter member (28).

9. The deflection device according to claim 7, wherein the insert (24) is provided with the slide coating (22) at least on the contact surface (30).

10. The deflection device according to claim 1, wherein the epoxy resin powder paint comprises the at least one epoxy resin in the proportion of from 85 to 90 wt-% based on the total weight of the epoxy resin powder paint.

11. The deflection device according to claim 1, wherein the epoxy resin powder paint comprises the polytetrafluoroethylene in the proportion of from 5 to 10 wt-% based on the total weight of the epoxy resin powder paint.

12. The deflection device according to claim 1, wherein the epoxy resin powder paint comprises the fillers and/or additives in the proportion of from 0 to 6 wt-% based on the total weight of the epoxy resin powder paint.

13. The deflection device according to claim 1, wherein the epoxy resin powder paint comprises the epoxy resin and polytetrafluoroethylene as well as further additives.

14. The deflection device according to claim 1, wherein the epoxy resin powder paint comprises the epoxy resin and polytetrafluoroethylene as well as fillers and further additives.

* * * * *